Figure 1:
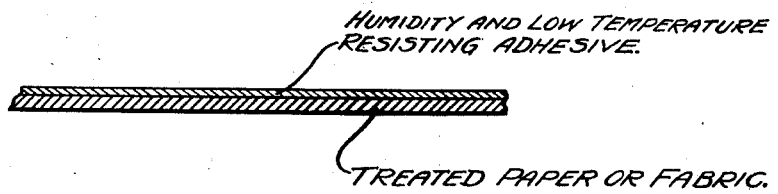

April 7, 1931.  F. W. HUEMPFNER  1,799,797
ADHESIVE
Filed March 5, 1928

Patented Apr. 7, 1931

1,799,797

UNITED STATES PATENT OFFICE

FERDINAND W. HUEMPFNER, OF CHICAGO, ILLINOIS, ASSIGNOR TO MID-STATES GUMMED PAPER CO., OF CHICAGO, ILLINOIS, A CORPORATION OF ILLINOIS

ADHESIVE

Application filed March 5, 1928. Serial No. 259,381.

The present invention relates to adhesives and is particularly concerned with the provision of adhesives for use in connection with refrigeration.

The physical conditions to which adhesives are subjected in a refrigerator are particularly severe, due not only to the the extremely low temperatures, but to the relative humidity of the air in the refrigerator. The lowering of the temperature of the air supplied to the refrigerator increases its relative humidity so that the moisture in the air is absorbed by ordinary adhesives used upon gummed paper or cloth, destroying their adhesive quality. The contraction or expansion due to the changes in temperature when an article is placed in or removed from the refrigerator also has a detrimental effect upon the adhesives, tending to crack the adhesive layer and to loosen parts so secured together. These physical effects are particularly noticeable where ordinary gummed paper is used for securing packages which are placed in a refrigerator.

One of the objects of the present invention is the provision of an adhesive and/or an adhesive paper or fabric peculiarly adapted to withstand the conditions of service in refrigeration for long periods of time.

Another object of the invention is the provision of a gummed paper or fabric, the adhesive qualities of which are not affected by moisture or by extremely low temperatures.

Another object of the invention is the provision of a gummed paper or fabric, the adhesive constituents of which are insoluble in water and which may be remoistened only by the use of certain known solvents.

Another object of the invention is the provision of a gummed paper having an adhesive which is soluble only by the use of known solvents, and the paper of which is treated to retard permeation by said solvent.

Another object of the invention is the provision of a gummed paper having an adhesive which is capable of greater strength than any of the adhesives of the prior art, due to the increased bonding power between the adhesive and paper and with the article to which it is attached.

Another object of the invention is the provision of a gummed paper having adhesive gums especially treated to make them more tacky than they would otherwise be.

Another object of the invention is the provision of a new and improved adhesive of increased tackiness and strength.

Other objects and advantages of my invention will appear more fully from the following, which includes a detailed description of the preferred embodiment of my invention as well as examples of broader and more simplified forms of the same.

The drawing shows a gummed paper comprising a treated base being provided with a humidity and low temperature resisting adhesive on one surface thereof.

Although I shall describe the use of my adhesive in connection with a gummed paper, I desire it to be understood that my invention includes the adhesive per se which may also be used for many other purposes such, for instance, as uniting pieces of wood, metal, and other materials.

The principal constituent of my adhesive consists of one or more resinous gums such as copal, pontianak, kauri, sandarac, manila, dammar, mastic or others. The selection of one or the other of the resinous gums depends principally upon the other characteristics desired aside from the qualities of resisting moisture and exposure to low temperatures, such as, for instance, the degree of hardness, luster or the cost of the commercial gum.

The solvent employed in applying and remoistening my resinous adhesive may also be varied, depending upon the speed of solution required and the physical characteristics of the gum selected but, in general, I may use organic solvents such as volatile oils, esters, ethers, alcohols, ketones, naphtha, benzine and other distillation products or their derivatives. It should be noted that all of the resinous gums listed above are not readily soluble in all of the solvents mentioned, but the selection of a solvent will depend upon the resinous gum employed.

Many of the advantages of my invention may be realized without the employment of additional ingredients in the form of non-drying oils, but in the preferred embodiment I find that from one to six per cent by volume of a non-drying vegetable oil added to the resinous mixture will increase the bonding power of the adhesive, prevent the adhesive from becoming too brittle when in the roll and give the adhesive a certain degree of elasticity which is essential in resisting quick changes of temperature without deterioration.

Among the non-drying oils which may be employed for this purpose are castor oil, olive oil, and others. If desired, glycerine and similar substances may be used in place of a non-drying oil.

I shall now describe the method of manufacture and use of a preferred embodiment of my invention in the form of a gummed paper, but I desire it to be understood that the adhesive is equally applicable to the manufacture of gummed fabric and, in general, where the term "sheet" or "paper" is used in the following specification and claims, it is intended to include cloth, or cloth and paper combined, and other flexible materials which may serve as a base for gum as well as the ordinary paper.

The adhesive may be prepared by grinding two resins such as pontianak and copal to a fine powder, after which they are mixed in the proportions of two parts of pontianak to one part of copal by volume. The two resins selected are preferably resins which respond at different speeds to the solvents with which they are employed, and such is the case when the pontianak and copal are employed with a solvent of benzine and butyl alcohol as described hereinafter.

The mixed resin powders are then brought to such a consistency that they may be applied to paper or cloth by adding them to commercial benzine to which has been added a small amount of non-drying oil. I prefer to use about two per cent by volume of a non-drying oil such, for instance, as castor oil.

In this stage of the process I prefer to add from three to ten per cent by volume of ionizable substance such as certain acids or alkalis which I have found vary the size and adhesiveness of the gum molecules and make the finished product much more tacky and thus more satisfactory than it would be otherwise. For this purpose I may use from among the acids, acetic, citric, benzoic or hydrochloric, and from among the alkalis, ammonia, caustic soda or caustic potash. Generally speaking, when I employ the said alkalis, the percentage thereof is less than the percentage of acid employed to accomplish the same purpose.

The moist adhesive may then be applied to the paper or cloth sheets or strips in the usual manner by means of a roller covered with moist adhesive and a second roller for determining the thickness of the layer.

In order that the paper to which the adhesive is applied may not be attacked and disintegrated by the solvent employed, I prefer to first coat the sheet of paper with a coating of vegetable gum or animal glue which is practically insoluble with regard to the solvent employed for the adhesive. Such a vegetable gum may consist of a mixture of fifty parts of dextrine and fifty parts of water by volume, applied in sufficient amount to cover all porous surfaces of the paper and to form a permanent bond between the resinous gum and the paper. Where the gummed paper is to be applied to a metallic surface, a vegetable gum is preferably employed but where the gummed paper is not to be so used, an animal glue may be used.

The animal glue may consist of fifty parts of water and fifty parts of glue such as that derived from the hides of animals and this glue should preferably be treated to waterproof it. Such waterproofing operations are familiar to one skilled in the art, but one common method consists in heating the glue and water to about 140 to 150 degrees Fahrenheit and bringing the glue to a consistency of about 20 degrees Baumé. From one to three per cent of formalin (by volume) is then added to effect the waterproofing operation and the resulting product is applied warm to the cloth or fabric to cover the porous surface as previously described. After the paper or cloth has been so prepared and dried, the resinous gum may be applied and the coating of vegetable gum or animal glue will prevent the permeation of the paper by the solvent used for the resins.

The gummed paper, cloth or tape so prepared may be applied to cartons or other objects by moistening the adhesive with a solvent consisting of a mixture of two of the volatile liquids, preferably two parts of butyl alcohol to one part of benzine by volume. The gumed paper must be applied to the object almost immediately after the application of the solvent, because of the volatile nature of the solvent which quickly evaporates, drying the gum.

The treatment of the paper or cloth by means of a vegetable gum which is insoluble in benzine and butyl alcohol, effectively prevents the solvent from distinegrating the paper or cloth which would decrease the bonding power between the adhesive and the sheet.

One of the principal advantages of the resinous adhesives described is that the two resins respond at different rates of solution to the solvent of benzine and butanol with which the tape is moistened before application. The pontianak responds to the solvent very rapidly and in some case would crystallize were the copal not present. The copal responds quite slowly to the solvent so that it preserves the integrity of the adhesive. If it is desired to make the gummed paper or cloth absolutely moisture proof, both sides of the paper may be coated with a thin covering of the resinous gum, only one side of which is later remoistened for application to the article with which it is used. This renders the paper moisture proof and protects the paper from attacks of mold or other animal or vegetable organisms.

It will thus be observed that I have invented a novel gummed paper and an adhesive which is peculiarly adapted to withstand the conditions of service in refrigeration. The adhesive is not only waterproof but capable of withstanding quick changes of temperature without cracking or loosening from the paper or other article to which it is applied.

I desire it to be understood that many of the advantages of my invention may be realized without the employment of all of the elements included in the detailed description of the preferred embodiment, and that new results may be accomplished by the use of a single resinous gum in combination with the proper solvent.

While I have described a specific embodiment of my invention, I do not wish to be limited to all the specific details of the method of manufacture or combinations described but wish to avail myself of all changes within the scope of the appended claims.

Having thus described my invention, what I claim is new and desire to secure by Letters Patent of the United States, is:

1. A gummed paper comprising, a base, an adhesive coating on said base, comprising a mixture of two resinous gums, having different rates of solubility, and a small percentage of non-drying vegetable oil.

2. A gummed paper comprising, a base, an adhesive coating on said base, comprising a mixture of two resinous gums, having different rates of solubility, a small percentage f non-drying vegetable oil, and a small percentage of alkali adapted to increase the tackiness of said coating.

3. The method of applying a gummed sheet comprising, the step of providing the sheet with a resinous coating including two resins of different solubility characteristics and applying to said coating, a solvent having appropriate individual constituent solvents in proportion to the presence of the resins to be dissolved.

4. A gummed paper comprising a base, an adhesive coating on said base, comprising a mixture of two resinous gums, having different rates of solubility, a small percentage of non-drying vegetable oil, and a small percentage of acid adapted to increase the tackiness of said coating.

In witness whereof, 1 hereunto subscribe my name this 28th day of February, 1928.

FERDINAND W. HUEMPFNER.